United States Patent
Braga et al.

(12)

(10) Patent No.: US 6,448,335 B1
(45) Date of Patent: Sep. 10, 2002

(54) PARTIALLY CROSS-LINKED ELASTOMERIC POLYOLEFIN MIXTURES

(76) Inventors: Vittorio Braga, Ferrara (IT); Roberto Bonari, Cerro Maggiore (IT)

(*) Notice: Subject to any disclaimer, the term of this patent is extended or adjusted under 35 U.S.C. 154(b) by 0 days.

(21) Appl. No.: 09/509,137

(22) PCT Filed: Sep. 18, 1998

(86) PCT No.: PCT/EP98/05948
§ 371 (c)(1),
(2), (4) Date: Mar. 22, 2000

(87) PCT Pub. No.: WO99/15584
PCT Pub. Date: Apr. 1, 1999

Prior Publication Data

PCT Pub. Date:

(30) Foreign Application Priority Data

Sep. 24, 1997 (IT) ........................... MI97A2152

(51) Int. Cl.[7] .................. C08L 23/00; C08L 23/10; C08L 23/22
(52) U.S. Cl. .............. 525/71; 525/78; 525/86; 525/95; 525/98; 525/97; 525/99
(58) Field of Search ............ 525/71, 78, 86, 525/95, 97, 98, 99

(56) References Cited

U.S. PATENT DOCUMENTS 5,721,314 A * 2/1998 Hausmann .................. 525/71

FOREIGN PATENT DOCUMENTS

| EP | 0472946 | * | 8/1991 |
| EP | 0633289 | | 7/1994 |
| WO | 9201747 | | 7/1991 |
| WO | 9222607 | | 6/1992 |
| WO | 9837144 | | 2/1998 |

* cited by examiner

Primary Examiner—Jeffrey Mullis

(57) ABSTRACT

Mixtures of $C_2$–$C_{10}$ olefin polymers functionalized with carboxylic acids which are neutralized from 1 to 100% with metallic ions The mixtures comprise (by weight): (1) 100 parts of a heterophasic polyolefin composition comprising crystalline polypropylene and an elastomeric fraction of an ethylene/propylene or superior ethylene/α-olefin copolymer where the ethylene content is less than 40%; and (II) 0–250 parts of an elastomeric polymer selected from: a) ethylene/$C_3$–$C_{10}$ α-olefin copolymers containing at least 20% of a $C_3$–$C_{10}$ α-olefin; b) ethylene/methyl acrylate copolymers containing from 15 to 30% of recurrent units of methyl acrylate, and having a MFR ranging from 1 to 10 g/10 min; and c) polyisobutylenes; d) atactic propylene homopolymers and amorphous ethylene/$C_3$–$C_{10}$ α-olefins copolymers produced with metallocenic catalysts; and e) styrene block copolymers containing butadiene and isoprene as comonomer.

9 Claims, No Drawings

PARTIALLY CROSS-LINKED ELASTOMERIC POLYOLEFIN MIXTURES

This invention concerns ionomeric polymer mixtures. In particular, it relates to partially cross-linked thermoplastic and elastomeric polyolefin mixtures having low hardness, and the process for their preparation.

The mixtures of this invention are adequate for the use in the sectors of plasticized PVC and vulcanized elastomers.

In particular, by virtue of their tactile properties said mixtures are especially useful for the production of synthetic leather. In fact, the mixtures of the present invention are not only characterized by their low hardness, but cause the leather to feel much smoother and more satiny than the leathers produced with olefin polymers up to now.

Thanks to the above mentioned tactile characteristics, particularly softness, smoothness, and satiny texture, in addition to satisfactory properties at medium-high temperatures, said mixtures can be used as substitutes for PVC.

An other possible application for said compositions is their use in the shoe soles sector because of their good abrasion resistance.

Some partially cross-linked polyolefin compositions of the soft type are already described in European patent application EP-A-633289. However, said compositions are obtained by way of cross-linking with peroxide and a cross-linking coagent.

One problem presented by said known compositions consists in the fact that their surface is somewhat tacky, and said tackiness reveals itself in time. Compared to said compositions, the aesthetic aspect of the product manufactured with the mixtures of this invention is considerably improved.

Also known is the not cross-linked form of some of the mixtures of the present invention, as described in European patent application 97200530.0.

Said mixtures also show a minimum degree of tackiness (soft touch), a slight tendency of the components of the mixtures to separate, and a good but not high elastomeric property.

Now it has been found that the undesired tackiness phenomena are reduced in elastomeric polyolefin mixtures which are partially cross-linked with metallic ions.

Moreover, the mixtures of the present invention present satisfactory properties at high temperatures, in particular they show good elastic recovery as shown by the low tension set values at 100° C.

In particular, it has been found that those mixtures of the present invention that correspond to the not cross-linked mixtures described in the above mentioned European patent application 97200530.0 not only show the disappearance, or diminishing, of the above mentioned problems, but also present improved elastomeric properties.

From the mixtures of this invention one can obtain products that are just as soft as the ones derived from the composition of the above mentioned patent application, and at times even more so. Said products have a Shore A hardness around 60–90 points. In spite of the increased softness, the compositions of the present invention display more resistance to abrasion than the ones of said patent application.

The problem of mixture separation is also overcome since the mixtures of this invention are very homogeneous and stable in time.

Therefore, object of the present invention is a ionomer polymer mixture comprising $C_2$–$C_{10}$ olefin polymers grafted with monomers containing al least one functional group, such as carboxylic acids, and metallic ions. Said ionomer polyolefin mixture comprises (weight percentage):

I. 100 parts by weight of a heterophasic polyolefin composition comprising:
   a. 5–50%, preferably 10–40%, of a crystalline propylene homopolymer with an isotactic index greater than 80%, preferably from 85 to 90%, or a crystalline copolymer of propylene, ethylene and/or a $CH_2$=CHR α-olefin, where R is a $C_2$-$C_8$ alkyl radical, or mixtures thereof; said copolymers containing more than 85% of propylene, and having an isotactic index greater than 80%;
   b. 0–20%, preferably 0–15%, of a crystalline fraction of a copolymer of ethylene/propylene, or ethylene/$CH_2$=CHR α-olefin, where R is a $C_2$-$C_8$ alkyl radical, or ethylene/propylene/said α-olefin; said fraction being insoluble in xylene at ambient temperature; and
   c. 40–95%, preferably 50–75%, of an elastomeric fraction of a copolymer of ethylene/propylene, or ethylene/$CH_2$=CHR α-olefin, where R is a $C_2$-$C_8$ alkyl radical, or ethylene/propylene/said α-olefin, and optionally with minor quantities of a diene; said copolymer fraction containing less than 40% of ethylene, preferably from 20 to 38%, and being soluble in xylene at ambient temperature; and II. 0–250 parts by weight, preferably 0–200, more preferably 0–150, of an elastomeric polymer selected from:
   a. copolymers of ethylene with a $C_3$-$C_{10}$ α-olefin, and optionally a diene, containing at least 20% of said α-olefin;
   b. copolymers of ethylene with methyl acrylate containing from 15 to 30% of recurring units of methyl acrylate or vinyl acrylate, and having a MIE ranging from 1 to 10 g/10 min (ASTM D-1238);
   c. polyisobutylenes having a molecular weight ranging from 100,000 to 300,000 ca. measured as average viscosity;
   d. atactic propylene homopolymers, and amorphous copolymers of ethylene with $C_3$-$C_6$ α-olefins produced with a catalyst obtained by contacting (1) a component comprising a transition metal M and at least one M-π bond and a legand and (2) a cocatalyst; and
   e. styrene block copolymers containing at least one comonomer selected from butadiene and isoprene.

Among the above mentioned polyolefin mixtures the ones that are preferred are those that present a Shore A hardness of about 60–80 points. Said hardness values can be more easily obtained by adding hydrocarbon extender oils to the mixture of the present invention. Otherwise, said hardness values are typical of partially cross-linked mixtures containing, in addition to the above mentioned heterophasic composition (I), also the above mentioned elastomeric olefin polymers (II). Therefore, the mixtures of the present invention that are particularly preferred are the ones comprising (weight percentage):

1. 30–80%, preferably 40–75%, of the above mentioned heterophasic composition (I); and
2. 20–70%, preferably 20–65%, more preferably 25–60%, of the above mentioned elastomeric polymer (II).

Examples of heterophasic polyolefin compositions (I) are described in published European patent application EP-A-O 472946 (Himont Inc.).

As a way of example the total quantity of ethylene in heterophasic compositions (I) ranges from 15 to 35% by weight. Moreover, the intrinsic viscosity of fraction (C) generally ranges from 1.5 to 4 dl/g.

Preferably the content of propylene in the copolymers of fraction (A) ranges from 90 to 99% by weight. The isotactic index is defined as fraction insoluble in xylene at ambient temperature (see note 1 below). For the purpose of this document by said temperature is intended a temperature around 25° C.

Preferably the content of ethylene in fraction (B) is at least 75% by weight, more preferably at least 80% by weight, with respect to the total weight of (B). Preferably the copolymer is an essentially linear ethylene/propylene copolymer, for example a linear low density polyethylene (LLDPE).

Examples of $CH_2=CHR$ α-olefins, where R is a $C_2-C_8$ alkyl radical, linear or branched, which can be present in heterophasic composition (I) are 1-butene, 1-pentene, 4-methyl-1-pentene, 1-hexene, and 1-octene.

When present, the diene in fraction (C) of (I) ranges from 1 to 10% by weight, preferably 2.5–7%, with respect to the total weight of (C). Examples of dienes are butadiene, 1,4-hexadiene, 1,5-hexadiene, and 5-ethylidene-2-norbornene.

The above mentioned heterophasic composition (I) can be prepared by mixing fractions (A), (B), and (C) in the fluid state, i.e., at temperatures greater than their softening or melting point, or by way of sequential polymerization in two or more stages in the presence of a highly stereospecific Ziegler-Natta catalyst. In particular, the catalyst system used comprises (i) a solid catalyst component containing a titanium compound and an electron-donor compound supported on magnesium chloride, and (ii) an Al-trialkyl compound and an electron-donor compound.

Examples of said catalysts are described in European patent EP 45977 and U.S. Pat. Nos. 4,339,054, 4,472,524 and 4,473,660.

The electron-donor compound contained in solid catalyst component (I) is selected from ethers, ketones, lactones, compounds containing N, P and/or S atoms and mono- or dicarboxylic acid esters.

Esters of phthalic acids, such as diisobutyl-, dioctyl-, and diphenyl phthalates, and benzyl butyl phthalate, are particularly suitable.

Further particularly suitable electron-donor compounds are 1,3-diether compounds having the formula

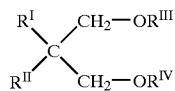

wherein $R^I$ and $R^{II}$ are the same or different and are $C_1-C_8$ alkyl, $C_3-C_{10}$ cycloalkyl or $C_6-C_{10}$ aryl radicals; $R^{III}$ or $R^{IV}$ are the same or different and are $C_1-C_4$ alkyl radicals or 1,3-diethers wherein the carbon atom in the 2 position belongs to a cyclic or polycyclic ring containing 5, 6 or 7 atoms and two or three sites of unsaturation.

Ethers having the above stated structures are described in published European patent applications EP-A-361493 and 728769. Representative examples of the above compounds are: 2-methyl-2-isopropyl-1,3-dimethoxypropane, 2,2-diisobutyl-1,3-dimethoxypropane, 2-isopropyl-2-cyclopentyl-1,3-dimethoxypropane, 2-isopropyl-2-isoamyl-1,3-dimethoxypropane and 9,9-bis(methoxymethyl) fluorene.

Examples of sequential polymerization processes are +described in the above mentioned European patent application EP-A-O 472946. When heterophasic composition (I) is prepared by way of sequential polymerization, fraction (B) is present in a quantity greater than or equal to 1% by weight. When said fraction (B) is present, it is preferable that the (B)/(C) weight ratio be less than 0.4, particularly from 0.1 to 0.3. It is also preferable that the weight percentage of fraction (C), or the sum of fractions (B) and (C), be from 50 to 90%, preferably from 65 to 80%, with respect to heterophasic composition (I). The above mentioned sequential polymerization process for the production of heterophasic composition (I) comprises at least two stages: the propylene, by itself or with the above mentioned α-olefins, is polymerized in the first stage to form fraction (A), and in the subsequent stages the polymerization of ethylene/propylene and/or an other α-olefin, and optionally a diene, is carried out to form fractions (B) and (C). The polymerization processes take place in liquid, gas, or liquid/gas phase. The reaction temperature in the various stages of polymerization can be equal or different, and generally ranges from 40° to 90° C., preferably from 50° to 80° in the production of fraction (A), and from 40° to 60° C. in the production of fractions (B) and (C).

Among the copolymers of ethylene with a $C_3-C_{10}$ α-olefin (copolymers (a)) the ones particularly suitable are those containing preferably from 20 to 70% (IR analysis) of said α-olefin, and having an Mw/Mn ratio lower than 4, preferably lower than 3. Preferred examples are the ethylene copolymers with 1-octene. Even more preferred are those having a weight content of 1-octene ranging from 20 to 45% (according to $^{13}$C-NMR analysis). Preferably said polymers have a density of less than 0.89 g/ml.

A specific example of copolymer (a) is a copolymer containing 72% by weight of ethylene and 28% by weight of 1-octene (according to IR analysis provided by Dow Chemical), having a Shore A hardness of 66 points, and a density of 0.863 g/ml.

An other specific example is a copolymer containing 75% by weight of ethylene and 25% by weight of 1-octene (according to IR analysis provided by Dow Chemical), having a Shore A hardness of 75 points, and a density of 0.868 g/ml.

An other specific example is a copolymer containing 76% by weight of ethylene and 24% by weight of 1-octene (according to IR analysis provided by Dow Chemical), having a Shore A hardness of 75 points, and a density of 0.87 g/ml.

Preferred examples of copolymers (a) are also the ethylene/propylene and ethylene/1-butene copolymers. The content of ethylene in said copolymers preferably ranges from 45 to 75% by weight.

When polymers (a) contain a diene said diene is nonconjugated. Examples of nonconjugated dienes and their preferred quantities are the same as the ones mentioned above for fraction (C) of composition (I).

Preferred examples of copolymers (b) are the copolymers containing from 20 to 25% by weight of methyl acrylate units, and having a MIE ranging from 1.5 to 6 g/10 min. The preferred polyisobutylenes are those having a molecular weight ranging from 110,000 to 250,000, determined by viscosity; some examples are the polyisobutylenes MML 100 marketed by Exxon. A specific example is the one having a molecular weight of 125,000. The elastomeric polymers (II) (d) are either (d') atactic homopolymers of propylene, or its copolymers, with 0.5–10% by weight of ethylene and/or $C_4-C_{10}$ α-olefins, or (d") amorphous ethylene copolymers with $C_3-C_{10}$ α-olefins. The latter containing, for example, a quantity of comonomer ranging from 10 to 70%, preferably from 15 to 60% by weight.

Among the above mentioned $C_4$–$C_{10}$ comonomers, linear or branched, the preferred olefins are the same already referred to for the above mentioned heterophasic composition.

Said polymers (d') have the following characteristics:

intrinsic viscosity [η]: greater than 1, preferably ranging between 1 to 15, more preferably between 1 to 3, dl/g;

%(r)–%(m)>0, where %(r) is the percentage of the syndiotactic dyads, and %(m) is the percentage of the isotactic dyads;

less than 2% of the $CH_2$ groups in the $(CH_2)_n$ sequences, where $n \geq 2$; and Bernoulli index (B)=1±0.2.

The copolymers (d") have the following characteristics:

the quantity of propylene in the copolymer (%P), expressed in mole percentage, and the ratio of the EPE/(EPE+PPE+PPP) triads satisfy the following equation: 0.01 %P+EPE/(EPE+PPE+PPP)$\geq$1; and less than 2% of the $CH_2$ groups are contained in the $(CH_2)_n$ sequences where n is an even number.

The above mentioned Bernouilli index is defined as follows:

$$B=4[mm][rr]/[mr]^2$$

where [mm], [rr], and [mr] represent, respectively, the percentage of the isotactic triads, syndiotactic triads, and heterotactic triads in the polymer determined by way of $^{13}$C-NMR analysis. Said index has values close to the unity, in particular ranging from 0.8 to 1.2, preferably from 0.9 to 1.1.

As mentioned above, said polymers (d) are obtained with homogeneous catalysts based on Zr, Ti, or Hf compounds having at least one cyclopentadienyl ring ligand, and with an alkyl aluminoxane as cocatalyst. Said polymers are described, for example, in European patent applications EP-A-604917 and EP-A-632066 published in the name of Spherilene.

The methods for preparing the ionomeric polymers of the mixtures of the present invention are known.

As previously stated, the polymers of the mixture of this invention are functionalized. As a way of example, their functionalization occurs by way of grafting on the polymers unsaturated monomers containing carboxylic groups or their derivatives, such as esters and anhydrides. Said monomers can contain one or more, such as two for example, carboxylic groups or their derivatives. Examples of said monomers are the vinyl monomers acids, the preferred ones being the acrylic and methacrylic acids. Other examples are the ethacrylic, itaconic and citraconic, maleic, and fumaric acids, and the corresponding anhydrides and esters.

In the mixture of the present invention the above monomers with polar groups are present in quantities ranging from 0.1 to 25%, preferably from 0.6 to 10%, by weight with respect to the weight of the polymer mass. Said polar groups are neutralized from 1 to 100% with metallic ions.

The ionic metal present in the mixture of this invention is a metal belonging to Group I or II of the Periodic Table. Examples of said metals are sodium, lithium, potassium, zinc, magnesium, and calcium; the last three listed are the preferred ones.

The quantity of metallic ions vary within the interval mentioned above, and depend on the desired degree of cross-linking as well as the quantity of functional groups grafted on the polymer.

The mixture of this invention is partially cross-linked. The definition of "partially cross-linked" refers to the degree of cross-linking, that is to say that the gel content with respect to the weight of the elastomeric fraction soluble in xylene at ambient temperature before cross-linking is preferably less than 70%, more preferably less than 50%. The gel corresponds mostly to the fraction of elastomeric copolymer that is rendered insoluble due to cross-linking. Said gel can also comprise a small fraction of propylene homopolymer and copolymer which become insoluble because they have also been cross-linked.

In addition to the above mentioned components, the mixture of the present invention can contain other ingredients that are normally added to thermoplastic polymers and to elastomers. Said additives are, for example, reinforcing fillers (such as silica, talc, and carbon black), pigments and dies, antioxidants, thermal and optical stabilizers, antistatic agents, plasticizing agents, and lubricants such as hydrocarbon extender oils.

The mixture of the present invention can be prepared using various methods.

For example, the heterophasic composition (I), the elastomeric polymers (II) if added, the monomers with polar groups, and optional additives are mixed at the same time under conditions that cause the grafting of the monomers with polar groups to the polymers. To the mixture thus obtained is mixed the metal, which is added, for example, in the form of oxide, hydroxide, or salt, as carbonate, or mixtures of the above mentioned compounds.

The above mentioned grafting reaction is carried out using known techniques. One method, for example, consists of grafting the above mentioned polar monomers to the polymers in the presence of radical initiators. By appropriately choosing the quantities of the above mentioned functional groups which are added to the polymer to be modified one obtains a polymer which is modified with polar monomers, and has the composition previously described. Said modification occurs by using the proper quantity of free radical initiator, and operating preferably in an inert atmosphere, such as nitrogen for example. For said process one can use the same mixing and extrusion apparatus described below for the preparation of the mixture of the present invention.

An alternative method for the preparation of the grafted polymer consists of preparing in advance a concentrate comprising a polymer matrix, monomers with polar groups, and free radical initiators. Subsequently said concentrate is mixed with heterophasic composition (I), the elastomeric polymers (II), if added, and other additives that are optionally used, operating under conditions that cause the grafting reaction to occur.

The above polymer matrix of the concentrate can have, for example, the same composition of elastomeric polymer (II), or of heterophasic composition (I), the latter being the preferred one. As an alternative, one can use a polymer different from the above mentioned components (I) and (II), but compatible with them, such as for example a fraction of heterophasic composition (I).

The above mentioned mixing processes are carried out in apparatus commonly used for said purpose. For example, the mixing can occur by using internal mixers (a Banbury for example), or single-screw extruders (a Buss for example), or a twin-screw extruder with mixing elements.

The mixing temperature generally ranges from 170 to 250° C.

The mixtures of the present invention are adequate for the preparation of products manufactured by way of various known processes, such as for example compression and injection molding, extrusion, thermoforming, calandering, and foaming.

Therefore, additional objects of the present invention are foamed mixtures produced from the above mentioned partially cross-linked mixtures, and the foamed products obtained from them.

The above mentioned foamed mixtures are flexible and soft. Said properties allow said foamed mixtures to be used in many applications, for example in the automotive sector, or other sectors such as in the manufacture of wheels for baby carriages, shock absorbing structures, etc.

The density of the foamed mixtures of this invention preferably range from 0.2 to 0.5 g/ml.

In order to obtain the foamed mixtures and foamed products of the present invention one can use processes and foaming agents commonly known in the art.

The foaming agents that can be used are both of the chemical and physical types. In the case of the former their decomposition temperature ranges from 100° to 220° C. ca.

The chemical foaming agents that are suitably used develop gas by way of thermal decomposition or chemical reactions. Examples of said foaming agents are: azodicarbonamides, sulfonylhydrazides, dinitropentamethylenetetramines, p-toluenesulfonyl semicarbazide, trihydrazine-triazine, barium azodicarboxilate, sodium borohydride, phenylsulfone, gypsum and alumina trihydrates, sodium bicarbonate or its mixtures with citric acid, and generally speaking all the products used in the art for this purpose whose decomposition temperature is at least equal to the softening temperature of the cross-linked polymer.

All the physical foaming agents known can be used, such as for example: light aliphatic hydrocarbons, optionally fluorinated and chlorinated, having a boiling point greater than 25° C., such as pentane, hexane, dichlorotrifluoroethanes, methylene chloride; or gas or liquid compounds having a boiling point lower than 25° C., such as air, nitrogen, carbon dioxide, chlorofluoromethane, dichlorodifrluoromethane, propane, butane, and isobutane.

In the processes for the preparation of foamed mixtures one can use the extruders commonly used in the art, such as the single-screw and twin-screw extruders mentioned above.

The physical foaming agents are preferably injected or introduced in the molten polymer mass in the extruder at a distance, from the point where the solid polymer is fed, where said polymer is found melted and homogeneous.

The chemical foaming agents can be mechanically blended with the solid polymer before the extrusion phase. The dry blend thus obtained is then introduced in the first feeding area of the extruder, where the temperature ranges from 130° to 200° C. At the output of the extruder equipped with the appropriate die, for example a flat die or one with circular holes, one maintains the temperature that is most suitable for the foaming of the polymer. Said temperature preferably ranges from 125° to 200° C.

The foamed mixtures can be obtained during the preparation of the cross-linked mixture, for example by feeding into a twin-screw extruder a mixture comprising the polymer (II), the heterophasic composition (I), the peroxide, and the monomer with polar groups. At a given distance from the extruder's feeding point, for example at ⅔ of the extruder's length, one introduces in the molten mixture both the metal and the foaming agent, allowing the entire mixture to continue along the extruder, thus causing the foaming to occur at the extruder's output. In this case the extruder's temperature is generally maintained at a temperature ranging from 170° to 220° C.

According to an other method, the cross-linked mixture of the present invention can be prepared in advance in a mixer. Said mixture is then introduced into the twin-screw extruder. At a given distance from the extruder's feeding point one introduces a foaming agent into the molten mixture, allowing the entire mixture to continue along the extruder, thus causing the foaming to occur at the extruder's output. In this case the extruder's temperature is also generally maintained at a temperature ranging from 170° to 220° C.

The following examples are given in order to illustrate and not limit the present invention.

The methods used to obtain the data relative to the properties reported in the examples and in the description (unless otherwise specified) are listed below.

| Properties | Methods |
| --- | --- |
| Melt Index (MIE and MIL) | ASTM D-1238, condition E or L |
| Fraction soluble in xylene | (see note 1 below) |
| Intrinsic viscosity | Determined in tetrahydronaphthaline at 135° C. |
| Tension set 100% | ASTM D-412 |
| Tensile strength | ASTM D-638 |
| Elongation at break | ASTM D-638 |
| Hardness (Shore A and Shore D) | ASTM D-2240 |
| Abrasion | DIN 53516 B |

Note 1

Determination of percentage soluble in xylene: a solution of the sample in xylene is prepared at a concentration of 1% by weight, and said sample is kept in xylene under agitation for 1 hour at 135° C. Continuing to stir the solution is allowed to cool to 95° C., after which it is poured into a 25° C. bath, where it is allowed to rest for 20 minutes without agitation, and then the stirring resumes for an additional 10 minutes. Subsequently the solution is filtered, and acetone is added to a portion of the filtrate in order to cause the dissolved polymer to precipitate. The polymer obtained in this manner is recovered, washed, dried, and finally weighed in order to determine the percentage soluble in xylene.

Components Used in the Examples and Comparative Examples

1) Heterophasic composition (I) having a MIL of 0.6–1 g/l10 min comprising (weight percentages):
   A. 33% of a crystalline propylene random copolymer, and 4.3% of ethylene; the copolymer contains about 9% of a fraction soluble in xylene at 25° C., and has an intrinsic viscosity [η] of 1.5 dl/g;
   B. 6% of an essentially linear ethylene/propylene copolymer totally insoluble in xylene at 25° C.; and
   C. 61% of an amorphous ethylene/propylene copolymer containing 30% of ethylene, totally soluble in xylene at 25° C., and having an intrinsic viscosity [η] of 3.2 dl/g.

The composition is obtained by way of sequential polymerization in the presence of a high-yield and highly stereospecific Ziegler-Natta catalyst supported on $MgCl_2$.

2) Concentrate of heterophasic composition (1) with 5% by weight of maleic anhydride, and 1% by weight of 2,5-dimethyl-2,5-di(tert-butylperoxy)hexane.

3) Copolymer containing 72% by weight of ethylene, and 28% by weight of 1-octene (according to IR analysis provided by Dow Chemical), having a Shore A hardness of 66 points, and density of 0.863 g/ml. Said copolymer is marketed by Dow chemical with the trademark Engage 8180.

4) Copolymer containing 75% by weight of ethylene and 25% by weight of 1-octene (according to IR analysis provided by Dow Chemical), having a Shore A hardness of 75 points, and a density of 0.868 g/ml. Said copolymer is marketed by Dow Chemical with the trademark Engage 8150.

5) Copolymer containing 76% by weight of ethylene and 24% by weight of 1-octene (according to IR analysis provided by Dow Chemical), having a Shore A hardness of 75 points, and a density of 0.87 g/ml. Said copolymer is marketed by Dow Chemical with the trademark Engage 8200.

6) Atactic propylene homopolymer, and amorphous propylene copolymer with 30% by weight of ethylene. The homopolymer is totally soluble in xylene, and has an intrinsic viscosity of 2.57 dl/g, %(r)−%(m)=17.8 and B=0.99; the copolymer has an intrinsic viscosity of 2.2 dl/g. They are both produced by using dimethylbis(9-fluorenyl)silane zirconium dichloride, $(CH_3)_2Si(Flu)_2ZrCl_2$ as the catalyst. The above mentioned European patent application EP-A-604-917 describes said atactic polymer, the polymerization process, and the catalyst system.

7) Ethylene/propylene/ethylidene-1-norbornene polymer with 27% by weight of propylene and 3.5% by weight of 1-norbornene (EPDM rubber); Mooney $ML_{1+4}$ viscosity of 60 at 125° C.

8) Polyisobutylene (8) having a molecular weight of 125,000 determined by MML 100 viscosity, marketed by Exxon.

9) Trigonox 101/50: 50% by weight of 2,5-dimethyl-2,5-di(tert-butylperoxy)hexane, and 50% by weight of inert powder.

10) Irganox B 225: 50% by weight of pentaerythritol-tetrakis[3(3,5-di-tert-butyl4-hydroxyphenyl) propionate] (Irganox 1010)+50% by weight of tri(2,4-di-tert-butylphenyl)phosphite (Irgafos 168).

EXAMPLES 1–3

The heterophasic composition (1), the polymer concentrate (2), and the Engage 8180 copolymer are mixed in a Banbury internal mixer operating at 60 rpm at a temperature of 190 –200° C. After 3 minutes from the beginning of the mixing operation one adds the ZnO concentrate (trademark Rhenogran) at 80%. The mixing continues for an additional 3 minutes. The quantities of the components are shown in Table 1.

35 g of the mixture thus obtained are used to mold a 120×120×2 mm specimen using a compression press. The length of the molding process is 5 minutes, and it occurs at a temperature ranging from 200 to 220° C. Immediately after the specimen is cooled to 23° C. under compression in a second press.

Table 1 also shows the physical-mechanical properties of the above mentioned specimen.

TABLE 1

| Example | 1 | 2 | 3 |
|---|---|---|---|
| Heterophasic comp. (1) % | 63 | 50 | 45 |
| Engage 8180 % | 27 | 40 | 45 |
| Concentrate (2) % | 5 | 5 | 5 |
| ZnO concentrate % | 5 | 5 | 5 |
| Properties | | | |
| Shore A (5") points | 78 | 76 | 74 |
| Shore D (10") points | 29 | 27 | 25 |

TABLE 1-continued

| Example | 1 | 2 | 3 |
|---|---|---|---|
| Tensile strength Mpa | 17 | 17.4 | 16.3 |
| Elongation at break % | 815 | 835 | 855 |
| Tension set at 23° C. % | 24 | 19 | 16 |
| Tension set at 70° C. % | 30 | 25 | 24 |
| Tension set at 100° C. % | 28 | 26 | 25 |

EXAMPLES 4–5 and

Comparative Example 1c

Example 1 is repeated, the only difference being that the Engage 8180 copolymer is not added to the heterophasic composition (1).

The components of the mixture, respective quantities, and the physical-mechanical properties of the specimens obtained from said mixture are shown in Table 2.

TABLE 2

| Example | 4 | 5 | 1c |
|---|---|---|---|
| Heterophasic comp. (1) p/w | 85 | 75 | 100 |
| Concentrate (2) p/w | 10 | 10 | 0 |
| ZnO concentrate p/w | 5 | 5 | 0 |
| Vaseline oil p/w | 0 | 10 | 0 |
| Properties | | | |
| MIL g/10 min | 0.34 | 0.61 | 0.6 |
| Shore A (5") points | 89 | 81 | 89 |
| Shore D (10") points | 34 | 26 | 32 |
| Tensile strength Mpa | 12 | 15.5 | 22[1] |
| Elongation at break % | 830 | 790 | 800[1] |
| Tension set at 23° C. % | 31 | 34 | 45 |
| Tension set at 70° C. % | 26 | 34 | 50 |
| Tension set at 100° C. % | 23 | 34 | 40 |
| Insoluble at 25° C. (gel) % | 76.8 | — | — |

[1]Data determined on specimens produced by way of injection molding.

EXAMPLES 6–9

Example 1 is repeated, with the difference that an Engage 8150 copolymer is used instead of the Engage 8180 copolymer, and in example 9 a concentrate of zinc carbonate is used instead of the ZnO.

The quantities of the components of the mixtures are shown in Table 3. In Table 4 one finds the physical-mechanical properties of the specimens obtained from said mixtures.

Comparative Example 2c

Example 6 is repeated, the only differences being that the polymers are not grafted with functional groups, and the mixture is not cross-linked.

The components of the mixture and respective quantities are shown in Table 3. In Table 4 one finds the physical-mechanical properties of the specimens obtained from said mixture.

TABLE 3

| Example | 6 | 7 | 8 | 9 | 2c |
|---|---|---|---|---|---|
| Heterophasic comp. (1) % | 47.15 | 44.6 | 45.8 | 50 | 50 |
| Engage 8150 % | 47.15 | 44.6 | 45.8 | 49.9 | 49.9 |
| Concentrate (2) % | 4.7 | 8.9 | 4.6 | 5 | 0 |
| ZnO concentrate % | 0.9 | 1.8 | 3.7 | 0 | 0 |
| ZnCO$_3$ concentrate % | 0 | 0 | 0 | 4 | 0 |
| Irganox B225 % | 0.1 | 0.1 | 0.1 | 0.1 | 0.1 |

TABLE 4

| Example | 6 | 7 | 8 | 9 | 2c |
|---|---|---|---|---|---|
| MIL g/10 min | — | <0.05 | 0.23 | <0.5 | 0.89 |
| Shore A (5") points | 71 | 75 | 72 | 73 | 79 |
| Shore D (10") points | 27 | 29 | 27 | 26 | 26 |
| Tensile strength Mpa | 18 | 19.5 | 17.2 | 17.2 | 15.7 |
| Elongation at break % | 770 | 760 | 780 | 760 | 680 |
| Tension set at 23° C. % | 23 | 18 | 21 | 22 | 22 |
| Tension set at 70° C. % | 25 | 17 | 24 | 19 | 31 |
| Tension set at 100° C. % | 30 | 18 | 26 | 32 | 45 |
| Insoluble at 25° C. (gel) % | 32 | 51.4 | 36.4 | — | — |

EXAMPLE 10

Example 3 is repeated with the only difference being that the mixture also contains vaseline oil (trademark OB 55 AT).

The components of the mixture and respective quantities are shown in Table 5. In Table 6 one finds the physical-mechanical properties of the specimens obtained from said mixture.

EXAMPLE 11

Example 1 is repeated but using the components indicated in Table 5. In Table 6 one finds the physical-mechanical properties of the specimens obtained from said mixture.

TABLE 5

| Example | 10 | 11 |
|---|---|---|
| Heterophasic comp. (1) % | 40 | 50[1)] |
| Engage 8180 % | 40 | 0 |
| Engage 8200 % | 0 | 50 |
| Concentrate (2) % | 5 | 5 |
| ZnO concentrate % | 5 | 5 |
| Vaseline oil % | 10 | 0 |

[1)] MIL = 8 g/10 min

TABLE 6

| Example | 10 | 11 |
|---|---|---|
| MIL g/10 min | 0.4 | 4.9 |
| Shore A (5") points | 65 | 70 |
| Shore D (10") points | 19 | 21 |
| Tensile strength Mpa | 11.7 | 6.3 |
| Elongation at break % | 860 | 770 |
| Tension set at 23° C. % | 14 | 25 |
| Tension set at 70° C. % | 14 | 32 |
| Tension set at 100° C. % | 23 | 47 |

EXAMPLE 12

Example 2 is repeated with the difference that instead of the Engage 8180 copolymer one uses an EMA copolymer (ethylene copolymer with 29% by weight of methyl acrylate) in the quantities indicated in Table 7. Table 8 shows the properties of the composition.

EXAMPLE 13

Example 2 is repeated with the difference that instead of the Engage 8180 copolymer one uses a copolymer of ethylene with 30% by weight of propylene in the quantities indicated in Table 7. Table 8 shows the properties of the composition.

EXAMPLE 14

Example 2 is repeated with the difference that instead of the Engage 8180 copolymer one uses a propylene homopolymer in the quantities indicated in Table 7. Table 8 shows the properties of the composition.

EXAMPLE 15

Example 2 is repeated with the difference that instead of the Engage 8180 copolymer one uses the EPDM (7) rubber in the quantities indicated in Table 7. Table 8 shows the properties of the composition.

EXAMPLE 16

Example 1 is repeated with the difference that instead of the Engage 8180 copolymer one uses a polyisobutylene (8) in the quantities indicated in Table 7. Table 8 shows the properties of the composition.

TABLE 7

| Example | 12 | 13 | 14 | 15 | 16 |
|---|---|---|---|---|---|
| Heterophasic comp. (1) % | 50 | 50 | 50 | 50 | 50 |
| EMA copolymer % | 40 | 0 | 0 | 0 | 0 |
| EPR copolymer % | 0 | 40 | 0 | 0 | 0 |
| Homopolypropylene % | 0 | 0 | 50 | 0 | 0 |
| EPDM rubber % | 0 | 0 | 0 | 40 | 0 |
| Polyisobutylene % | 0 | 0 | 0 | 0 | 40 |
| Concentrate (2) % | 5 | 5 | 5 | 5 | 5 |
| ZnO concentrate % | 5 | 5 | 5 | 5 | 5 |

TABLE 8

| Example | 12 | 13 | 14 | 15 | 16 |
|---|---|---|---|---|---|
| Shore A (5") points | 83 | 72 | 62 | 69 | 68 |
| Shore D (10") points | 27 | 23 | 16 | 22 | 21 |
| Tensile strength MPa | 15.2 | 14.5 | 8.1 | 10.3 | 8.6 |
| Elongation at break % | 820 | 810 | 1350 | 670 | 770 |
| Tension set at 23° C. % | 30 | 22 | 22 | 16 | 28 |
| Tension set at 70° C. % | 28 | 26 | 23 | 22 | 40 |
| Tension set at 100° C. % | 36 | 26 | 26 | 22 | 37 |

EXAMPLE 17

The pellets of the mixture of example 2 are extruded at 170° C. in the presence of Na bicarbonate in a quantity of 3% by weight with respect to the weight of the mixture.

The resulting foamed strand has a density of 0.35–0.45 g/cm$^3$.

EXAMPLE 18

Example 17 is repeated using the pellets of the mixture of example 4.

The resulting foamed strand has a density of 0.35–0.45 g/cm$^3$.

EXAMPLE 19

Example 3 is repeated with the difference that one uses composition (1) degraded by visbreaking until it reaches a MIL of 8 g/10 min, and instead of the Engage 8180 polymer one uses Engage 8200. The resulting composition has a MIL of 5.3 g/10 min.

The properties of the specimen obtained in this manner are shown in Table 9.

Comparative Example 3c

Example 19 is repeated with the difference that only the heterophasic composition (1) and the Engage 8200 polymer are used in equal ratio. The resulting composition has a MIL of 7.5 g/10 min.

The properties of the specimen obtained in this manner are shown in Table 9.

TABLE 9

| Example and comparative example | 19 | 3c |
|---|---|---|
| Shore A (5") points | 78 | 79 |
| Shore D (10") points | 20 | 21 |
| Abrasion DIN mm³/40 m | 250 | 350 |

What is claimed is:

1. A partially cross-linked ionomer polymer mixture comprising $C_2$–$C_{10}$ olefin polymers to which are grafted unsaturated monomers containing at least one functional group, wherein 1 to 100% of the functional groups are neutralized with an ion of a metal of Groups I or II of the periodic table, said olefin polymers comprising (weight parts and percentages):
   I. 100 parts of a heterophasic polyolefin composition comprising:
      a. 5–50% of a crystalline propylene polymer selected from the group consisting of (a) a crystalline propylene homopolymer with an isotactic index greater than 80%, (b) a crystalline copolymer of propylene and at least one of ethylene and $CH_2$=CHR α-olefins, where R is a $C_2$–$C_8$ alkyl radical, and (c) a mixture of (a) and (b); said copolymers containing more than 85% of propylene, and having an isotactic index greater than 80%;
      b. 0–20% of a crystalline fraction of a copolymer of monomers selected from the group consisting of (a) ethylene/propylene, (b) ethylene/$CH_2$=CHR α-olefin, where R is a $C_2$–$C_8$ alkyl radical, and (c) ethylene/propylene/α-olefin; said fraction being insoluble in xylene at ambient temperature; and
      c. 40–95% of an elastomeric fraction of a copolymer of monomers selected from the group consisting of (a) ethylene/propylene, (b) ethylene/$CH_2$=CHR α-olefin, where R is a $C_2$–$C_8$ alkyl radical, and (c) ethylene/propylene/α-olefin, and optionally minor quantities of a diene; said copolymer fraction containing less than 40% of ethylene, and being soluble in xylene at ambient temperature; and
   II. 0–250 parts of an elastomeric polymer chosen from:
      a. copolymers of ethylene with a $C_3$–$C_{10}$ α-olefin, and optionally a diene, containing at least 20% of said α-olefin and having Mw/Mn less than 3;
      b. copolymers of ethylene containing from 15 to 30% of recurring units of methyl or vinyl acrylate, and having a MIE ranging from 1 to 10 g/10 min (ASTM D-1238);
      c. polyisobutylenes having a molecular weight ranging from 100,000 to 300,000 measured as average viscosity;
      d. atactic propylene homopolymers, and amorphous copolymers of ethylene with $C_3$–$C_6$ α-olefins produced with metallocene catalysts; and
      e. styrene block copolymers containing at least one comonomer selected from the group consisting of butadiene and isoprene.

2. The mixture of claim 1 comprising (weight percentage):
   I. 30–80% of heterophasic composition (I); and
   II. 20–70% of an elastomeric polymer (II).

3. The mixture of claim 2 where the elastomeric polymer (II) is a copolymer of ethylene with 1-octene.

4. A foamed product comprising the ionomeric polymer mixture of claim 1.

5. The heterophasic polyolefin composition of claim 1 wherein (A) is propylene/ethylene copolymer, (B) is a linear low density polyethylene, and (C) is an amorphous ethylene/propylene copolymer.

6. The ionomer polymer mixture of claim 1 wherein the monomer containing a functional group is maleic anhydride.

7. The ionomer polymer mixture of claim 1 wherein the heterophasic polyolefin composition is produced by sequential polymerization in the presence of a Ziegler-Natta catalyst.

8. The ionomer polymer mixture of claim 1 wherein the metal is zinc.

9. The ionomer polymer mixture of claim 1 wherein the elastomeric polymer (II), when present, is an ethylene/propylene/5-ethylidene-2-norbornene polymer.

* * * * *

UNITED STATES PATENT AND TRADEMARK OFFICE
CERTIFICATE OF CORRECTION

PATENT NO. : 6,448,335 B1
DATED : September 10, 2002
INVENTOR(S) : Vittorio Braga et al.

It is certified that error appears in the above-identified patent and that said Letters Patent is hereby corrected as shown below:

<u>Title page,</u>
Insert Item -- [73] Assignee: Basell Poliolefine Italia S.p.A. --.

Signed and Sealed this

Eighteenth Day of October, 2005

JON W. DUDAS
*Director of the United States Patent and Trademark Office*